Figure 1:
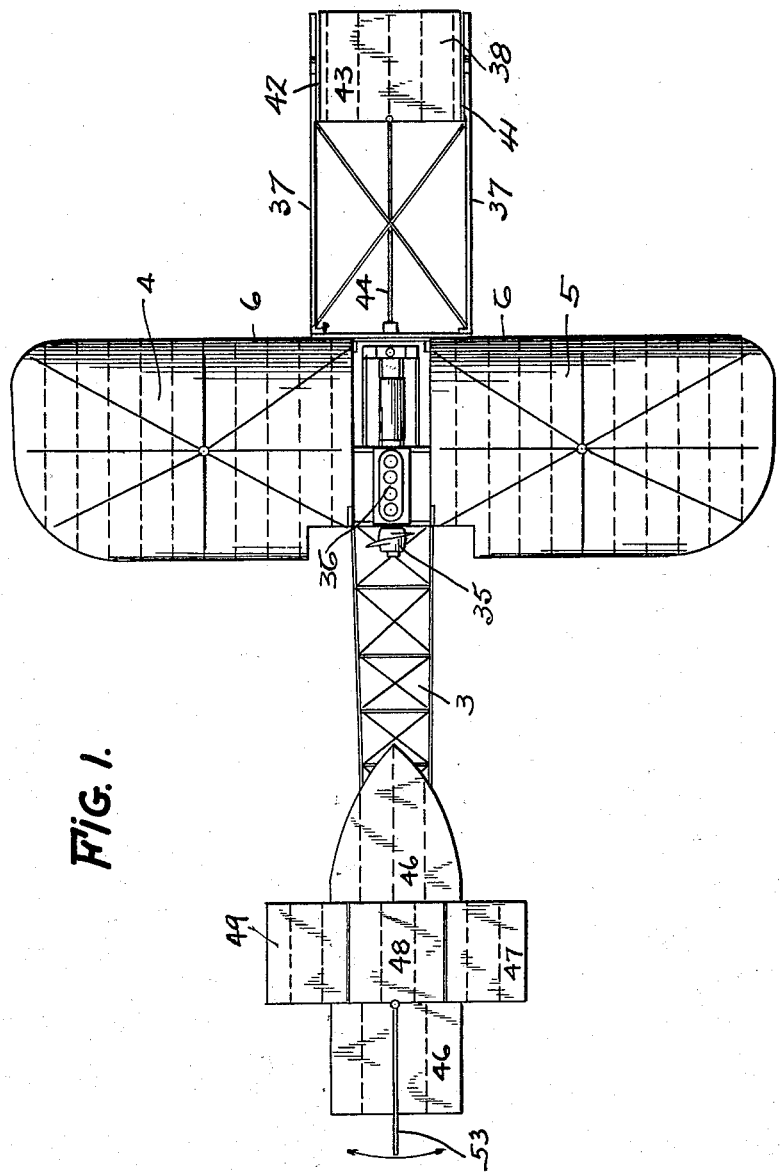

J. F. DE VILLA.
AEROPLANE.
APPLICATION FILED JULY 26, 1911.

1,056,643.

Patented Mar. 18, 1913.
6 SHEETS—SHEET 1.

WITNESSES:
T. W. Hawkins,
H. J. Prost.

INVENTOR:
JOHN F. DeVILLA.
By Miller & White
ATTORNEYS

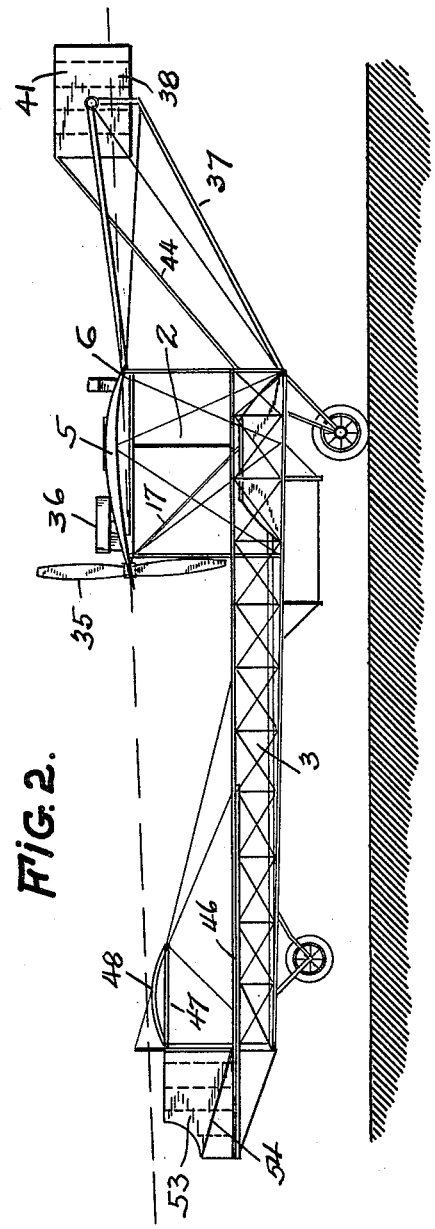

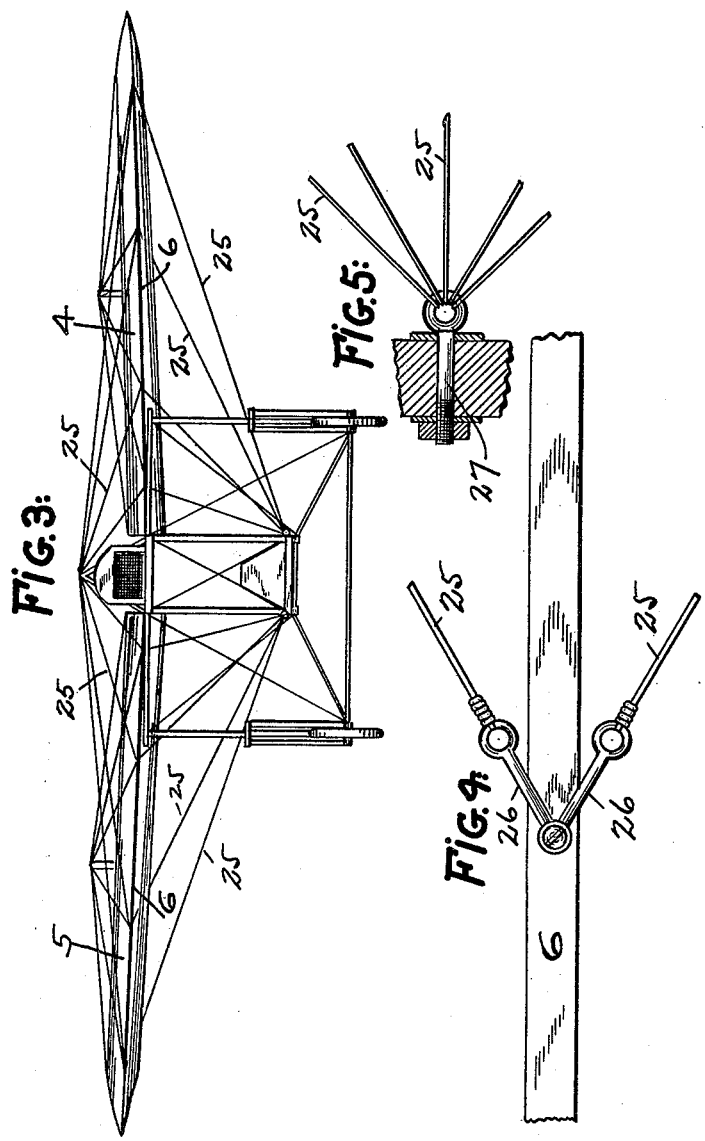

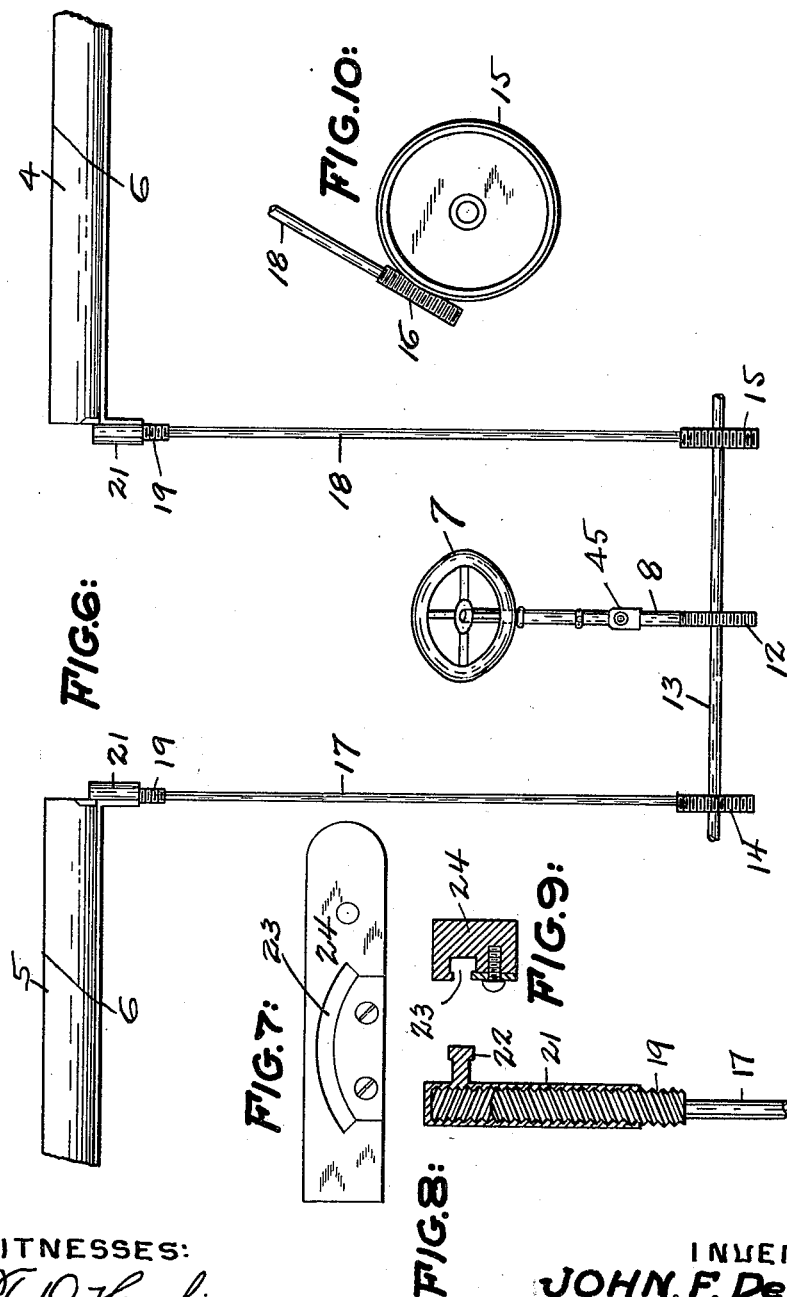

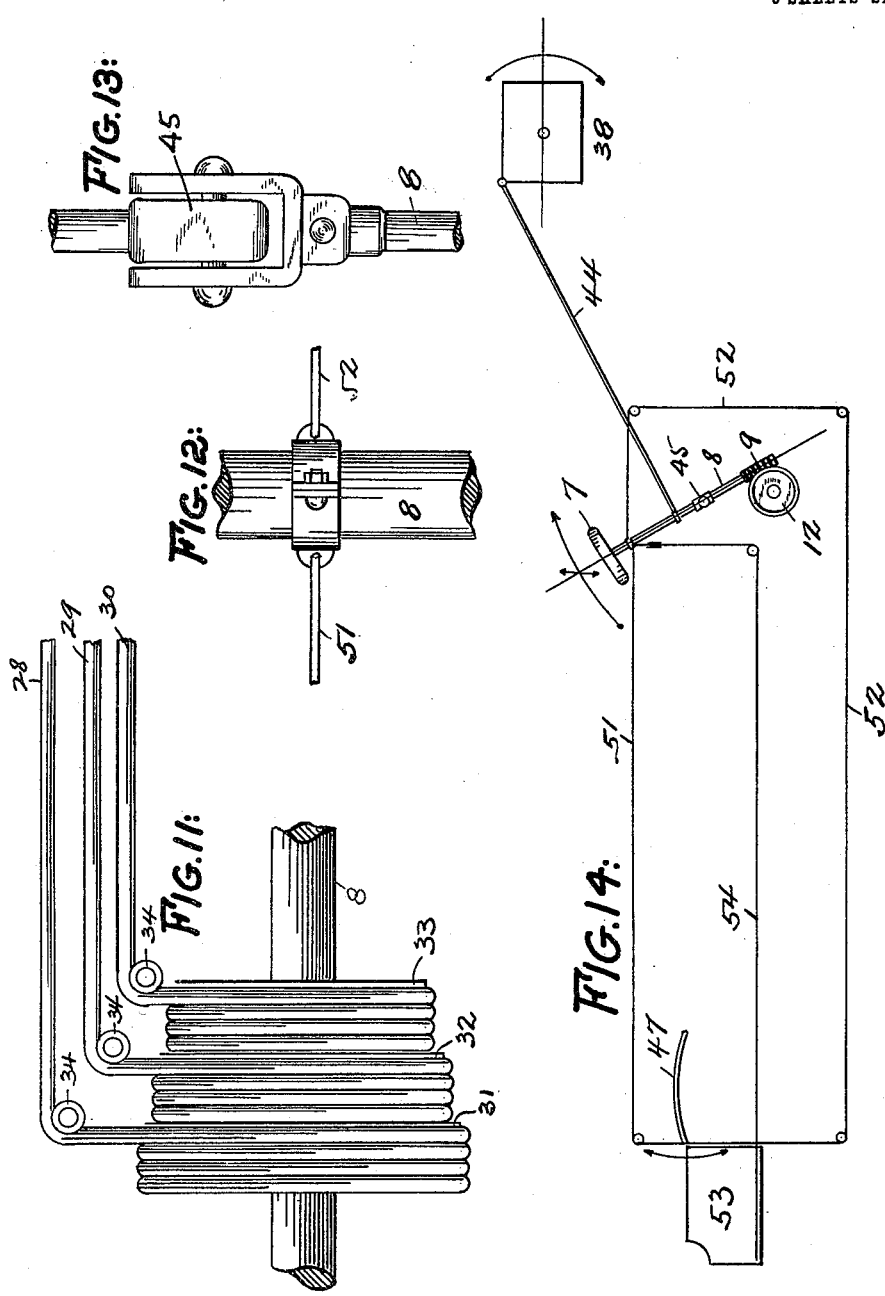

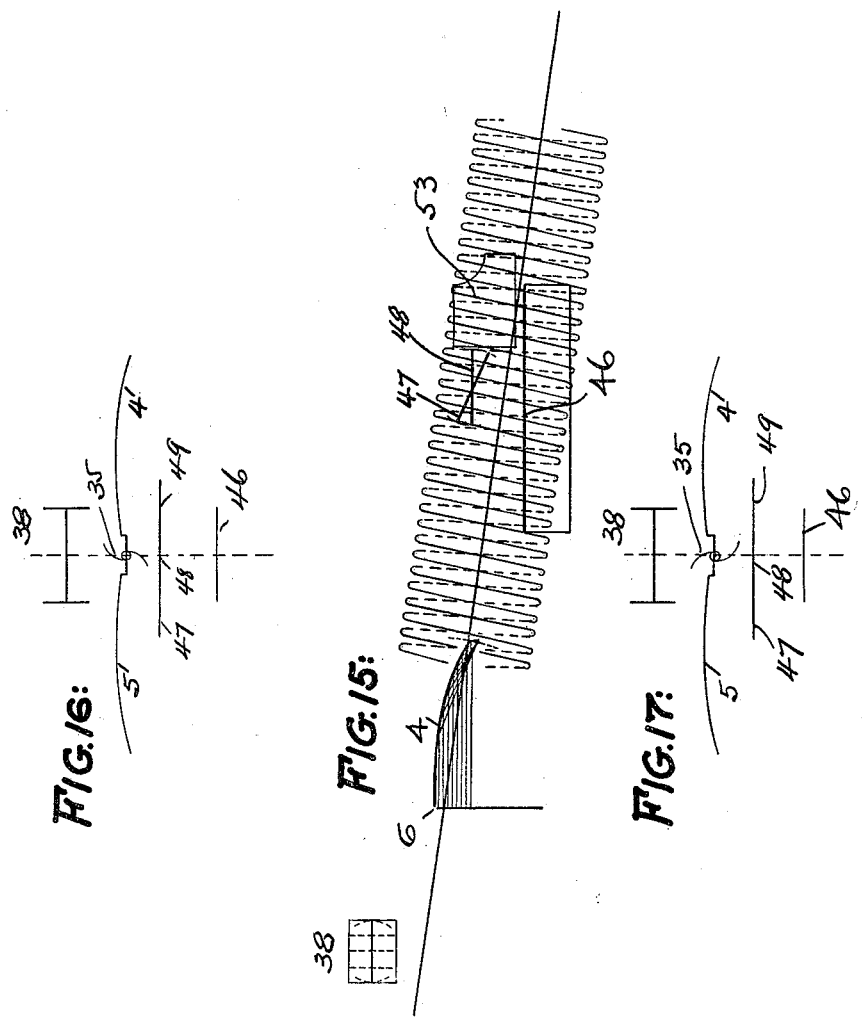

UNITED STATES PATENT OFFICE.

JOHN F. DE VILLA, OF SAN FRANCISCO, CALIFORNIA, ASSIGNOR OF ONE-HALF TO T. C. VAN NESS, JR., OF SAN FRANCISCO, CALIFORNIA.

AEROPLANE.

1,056,643. Specification of Letters Patent. Patented Mar. 18, 1913.

Application filed July 26, 1911. Serial No. 640,574.

*To all whom it may concern:*

Be it known that I, JOHN F. DE VILLA, a citizen of the United States, and a resident of the city and county of San Francisco and State of California, have invented certain new and useful Improvements in Aeroplanes, of which the following is a specification.

The invention relates to certain new and useful improvements in aeroplanes and more particularly to a novel arrangement of the carrying and guiding planes and an improved arrangement of the controlling means.

The object of the invention is to provide an aeroplane possessing greater stability and more flexible control while in flight than has heretofore been possible in machines of this type.

Another object of the invention is to provide an aeroplane in which the carrying planes are pivotally attached to the frame of the machine along their front edge.

Another object of the invention is to provide an aeroplane in which the control of the various elements thereof is centralized in one steering post, thereby obviating the use of separate levers for each element.

The construction possesses other advantageous features, which, with the foregoing, will be set forth at length in the following description, where I shall outline in full that form of embodiment of the invention which I have selected for illustration in the drawings accompanying and forming part of the present specification. The novelty of the invention will be included in the claims succeeding said description. From this it will be apparent that I do not restrict myself to the showing made by such drawings and descriptions, as I may adopt many variations within the scope of the invention as expressed in said claims.

Referring to the drawings: Figure 1 is a plan or top view of the aeroplane of my invention. Fig. 2 is a side elevation. Fig. 3 is a front elevation. Fig. 4 is a detail showing the means of connecting the brace wires to the front edge of the main planes. Fig. 5 is a detail showing the means of attaching the brace wires to the main frame. Fig. 6 is a detail of the means for turning the main planes about their front edge as a pivot. Fig. 7 is a detail of the connecting plate on the main planes to which the screw threaded sleeve of the adjusting means is attached. Fig. 8 is a section through the sleeve and screw. Fig. 9 is a cross section through the plate shown in Fig. 7. Fig. 10 is a detail of part of the plane control apparatus. Fig. 11 is a detail of the compensating drums for maintaining equal tension in the brace wires as the planes are tilted. Fig. 12 is a detail of the means for attaching the control wires to the steering post. Fig. 13 is a detail of the universal joint on the steering post. Fig. 14 is a diagrammatic representation of the control of the various rudders. Fig. 15 is a diagrammatic representation of the aeroplane showing the position of the various planes. Fig. 16 is a diagrammatic representation of the front view of the aeroplane. Fig. 17 is the same as Fig. 16 with the exception that the propeller is set to revolve in the opposite direction.

The aeroplane consists of a frame having sustaining and guiding planes arranged thereon and provided with means for propelling the device through the air. The frame is made of a suitable light material and is thoroughly braced with wires and struts so that it possesses the required strength. The frame is composed of two parts, the body 2 and the tail piece 3, which are firmly bound together.

The main carrying planes 4—5 are arranged transversely at the upper part of the body 2 and are of sufficient area to support the device in flight. These planes are formed on a curve transverse of the length, the curve being such that the lines of reflection of the impinging air lines meet in a line below the planes. This produces a greater air pressure below the planes than above, thereby providing a supporting force for sustaining the device in the air. These main sustaining planes 4—5 are pivoted to the body 2 along their front or leading edge 6 and are provided with means for moving the planes about such pivotal line. The effect of moving the planes in this manner is to vary the pressure below the planes and thereby vary the sustaining force of each plane. The pressure on the upper surface of the planes remains constant and the pressure on the lower surface is either increased or decreased as the rear edge is lowered or raised. Provision is made for moving these planes, the mechanism employed acting to move the planes in opposite directions so that the device can be laterally balanced very quickly should it become unbalanced by a gust of wind or variations in the atmosphere. Also in making turns the planes can be shifted so that the aeroplane will tilt at the proper angle.

The mechanism for operating the main planes is controlled from the hand-wheel 7 on the steering post 8 located in the body of the device adjacent the driver's seat. The steering post 8 is provided on its lower end with a worm 9 which meshes with a worm wheel 12 on shaft 13. The shaft 13 is provided on its ends with worm wheels 14—15 which mesh with worms 16 on the inclined shafts 17—18. These shafts are provided on their upper ends with screw threaded portions 19 which engage in screw threaded sleeves 21. These sleeves are rotatably attached to the main planes at a point adjacent the rear edge, by means of the lug or key 22 engaging in the slot 23 of the holding member 24. The arrangement of the various gears and threaded portions is such that when the hand wheel is turned the rear edge of one of the main planes is raised and the rear edge of the other is lowered. This arrangement gives perfect lateral balance control.

The front edges of the main planes are held stationary and rigid with relation to the frame by means of the brace wires 25, attached to the planes by means of the links 26 and to the frame by means of the eye-bolts 27. The rear edges of the planes are also suitably braced by brace wires 28—29—30 connected to points spaced apart along the rear edge. When the lateral balance control is being operated the rear ends of the planes are moved in opposite directions and some means must be employed for compensating the brace wires to this movement. As the points of attachment of the brace wires are spaced at varying distances from the frame, it is evident that the amount of compensation for each brace wire must be different. This difficulty is overcome by means of the pulleys 31—32—33 mounted on the steering post adjacent the worm 9 around which the brace wires travel. These pulleys are made of different diameters corresponding to the different compensation required, the wire requiring the greater compensation passing around the larger pulley. Idler pulleys 34 are employed to lead the brace wires in the proper direction from the compensating pulleys.

The aeroplane is driven by the propeller 35 which is operated by the engine 36. The propeller is arranged on the body 2 directly behind the main planes in such position that the line of thrust of the propeller is parallel to the chord of the main planes when these planes are in the central or parallel position.

Arranged in front of the main planes on the frame 37 is the horizontal rudder or box elevator 38 formed of the two vertical planes 41—42 and the horizontal plane 43. This elevator 38 is pivoted to the frame 37 so that it may be swung in a vertical arc to vary the inclination of plane 43. The adjustment of the elevator 38 is accomplished from the steering post 8, by means of the connecting rod 44. The steering post 8 is provided with a universal joint 45, above the compensating pulleys 31—32—33, so that the upper part of the post may be moved in any direction. The rod 44 is connected to this movable part of the post and longitudinal movement of the post with relation to the aeroplane, operates to vary the inclination of the elevator. This elevator is placed so that the horizontal plane lies in a plane of the air above the plane of the air which impinges against the main planes.

The tail frame 3 of the aeroplane extends backward from the lower portion of the body 2. Arranged on the tail frame is a fixed elongated plane 46 which is preferably pointed at its forward end. This plane is so placed that it lies below the axis of the propeller thrust and above the reflected air current from the main planes. The pressure on the under surface of this plane 46 is therefore greater than the pressure on the upper surface and the plane has a lifting effect. As the lifting force of the main planes vary with a variation in their position, the line of reflection is also varied and this varies the pressure under plane 46 with the effect of stabilizing the aeroplane.

Arranged above the plane 46 at about the center thereof and spaced apart therefrom a suitable distance are the planes 47—48—49. These planes are each of relatively small area, the area of plane 48 being slightly larger than either of planes 47 or 49. The plane 48 may be flat or slightly curved and is placed in such position that the axis of the propeller thrust passes between this plane and plane 46. The planes 47—48 and 49 lie below the area of low pressure air caused by the upper surface of the main planes and therefore the lifting power of the machine and its stability are greatly increased. All of the planes on the aeroplane engage in air which is denser than the normal and therefore the disadvantages due to the low pressure air or rarefied air coming from the upper surface of the main planes are avoided. The planes 47 are of equal area and are pivoted so that they may be moved in a vertical arc to raise or lower the pressure on the tail of the machine. These planes are operated from the steering post 8 by means of the wires 51—52 passing around suitable idlers. A movement of the upper part of the steering post forward or backward will change the angle of inclination of these planes.

The rod 44 operating the front elevator 38 is connected to the steering post at a point closer to the universal joint than the wires 51—52. This will cause a simultaneous movement of the planes 47—49 and 43. A lesser angle of inclination is required on the front plane 43 however, for a given angle on the rear planes 47 and 49 and the difference in distance of the two points of connection from the universal joint accomplishes this result. When the machine is ascending therefore, both front and rear planes are inclined upward and on account of the difference in inclination there is no tendency on the part of the tail to rise above the main planes. The front elevating plane may be dispensed with however and the machine guided vertically by means of the rear planes.

The machine is guided horizontally by the vertically disposed rudder 53 which is located centrally behind plane 48 and over plane 46. This rudder is operated from the steering post 8 by means of the wires 54 which extend backward on opposite sides of the tail. A movement of the upper part of the steering post sidewise causes this rudder to be operated. The connections of the various rods and wires to the steering post are loose so that the post can be turned to shift the main planes without affecting the other control elements. The frame is provided with wheels at the front and rear so that the machine will travel over the surface of the ground before rising and to provide a safe manner of alighting.

I claim:

1. In an aeroplane comprising a frame having the supporting planes pivoted thereto at the forward edges, brace wires attached to the rear edges of the planes, and means for compensating for the tension therein as the rear edges of the planes are moved.

2. In an aeroplane comprising a frame, having supporting planes pivotally attached thereto at their forward edges, a steering post connected to the planes and adapted by its operation to move the rear edges of the planes in opposite directions, brace wires attached to the rear edges of the planes and compensating pulleys mounted on the steering post to which said brace wires are attached.

3. An aeroplane comprising a frame, supporting planes mounted thereon at the forward end, tail planes arranged at the rear end, said tail planes being spaced apart vertically, the upper planes being the smaller, horizontally disposed rudders alined with and arranged on opposite sides of said upper plane and a vertically disposed rudder arranged behind said upper plane and above said lower plane.

JOHN F. DE VILLA.

Witnesses:
H. G. PROST,
R. HEFFERNAN.

Copies of this patent may be obtained for five cents each, by addressing the "Commissioner of Patents, Washington, D. C."